United States Patent
Kamepalli et al.

(10) Patent No.: US 11,150,751 B2
(45) Date of Patent: Oct. 19, 2021

(54) DYNAMICALLY RECONFIGURABLE TOUCHPAD

(71) Applicant: Dell Products, L.P., Round Rock, TX (US)

(72) Inventors: Srinivas Kamepalli, Austin, TX (US); Deeder M. Aurongzeb, Austin, TX (US); Mohammed K. Hijazi, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/408,219

(22) Filed: May 9, 2019

(65) Prior Publication Data

US 2020/0356194 A1 Nov. 12, 2020

(51) Int. Cl.
G06F 3/0354 (2013.01)
G06F 1/16 (2006.01)
G06F 3/0488 (2013.01)

(52) U.S. Cl.
CPC .......... *G06F 3/03547* (2013.01); *G06F 1/169* (2013.01); *G06F 1/1616* (2013.01)

(58) Field of Classification Search
CPC ....... G06F 1/1618; G06F 1/169; G06F 1/1677
See application file for complete search history.

(56) References Cited

U.S. PATENT DOCUMENTS

| | | | | |
|---|---|---|---|---|
| 5,666,438 A * | 9/1997 | Beernink | ............. | G06K 9/222 382/161 |
| 6,249,606 B1 * | 6/2001 | Kiraly | ............. | G06F 3/04883 345/156 |
| 2004/0233624 A1 * | 11/2004 | Aisenberg | ............. | G06F 1/1616 361/679.56 |
| 2006/0044259 A1 * | 3/2006 | Hotelling | ............. | G06F 1/1616 345/156 |
| 2006/0071915 A1 * | 4/2006 | Rehm | ............. | G06F 1/1686 345/173 |
| 2009/0309851 A1 * | 12/2009 | Bernstein | ............. | G06F 3/0416 345/174 |
| 2010/0007612 A1 * | 1/2010 | Locker | ............. | G06F 3/0418 345/173 |
| 2011/0026765 A1 * | 2/2011 | Ivanich | ............. | G06K 9/00355 382/103 |

(Continued)

OTHER PUBLICATIONS

International Search Authority (ISA), "International Search Report," International Application No. PCT/US2020/031897, dated Jun. 19, 2020, 2 pages, publisher Commissioner for Patents—PCT, Alexandria, Virginia, United States of America.

(Continued)

*Primary Examiner* — Sepehr Azari (74) *Attorney, Agent, or Firm* — Fogarty LLP (57) ABSTRACT

Systems and methods for a dynamically reconfigurable touchpad are described. In an illustrative, non-limiting embodiment, an Information Handling System (IHS) may include processor and a memory coupled to the processor, the memory having program instructions stored thereon that, upon execution by the processor, cause the IHS to: receive a configuration parameter from a user; and modify a touchpad by applying the configuration parameter to the operation of proximity sensors disposed under a non-display surface of the IHS.

19 Claims, 4 Drawing Sheets

(56) References Cited

U.S. PATENT DOCUMENTS

| | | | | |
|---|---|---|---|---|
| 2011/0304550 | A1* | 12/2011 | Romera Jolliff | G06F 3/016 345/168 |
| 2012/0169671 | A1* | 7/2012 | Yasutake | G06F 3/0425 345/175 |
| 2012/0262407 | A1* | 10/2012 | Hinckley | G06F 3/04883 345/173 |
| 2013/0162515 | A1* | 6/2013 | Prociw | G06F 1/1616 345/156 |
| 2014/0201666 | A1* | 7/2014 | Bedikian | G06F 3/04815 715/771 |
| 2014/0267019 | A1* | 9/2014 | Kuzmin | G06F 3/017 345/156 |
| 2014/0267121 | A1* | 9/2014 | Luo | G06F 3/04886 345/173 |
| 2014/0304665 | A1* | 10/2014 | Holz | G06K 9/00335 715/863 |
| 2014/0320428 | A1* | 10/2014 | Matsuda | G06F 3/03547 345/173 |
| 2015/0100910 | A1* | 4/2015 | Luo | G06F 3/04886 715/771 |
| 2015/0103043 | A1* | 4/2015 | Hills | G06F 3/0416 345/174 |
| 2015/0277598 | A1* | 10/2015 | Aurongzeb | G06F 1/1618 345/157 |
| 2016/0098107 | A1* | 4/2016 | Morrell | G06F 3/03547 345/173 |
| 2016/0103496 | A1 | 4/2016 | Degner et al. | |
| 2018/0164910 | A1* | 6/2018 | Ent | G06F 3/0233 |
| 2019/0250666 | A1* | 8/2019 | Klein | G06F 3/0393 |
| 2019/0258298 | A1* | 8/2019 | Arima | G06F 3/1423 |
| 2020/0064892 | A1* | 2/2020 | Iyer | G06F 3/0487 |
| 2020/0183580 | A1* | 6/2020 | Bertrand | G06F 3/04847 |

OTHER PUBLICATIONS

International Search Authority (ISA), "Written Opinion of the International Searching Authority," International Application No. PCT/US2020/031897, dated Jun. 19, 2020, 7 pages, publisher Commissioner for Patents—PCT, Alexandria, Virginia, United States of America.

* cited by examiner

DYNAMICALLY RECONFIGURABLE TOUCHPAD

FIELD

This disclosure relates generally to Information Handling Systems (IHSs), and more specifically, to systems and methods for a dynamically reconfigurable touchpad.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

In some implementations, a user may interact with an IHS via a touchpad. A touchpad is a surface that employs a tactile sensor to translate the motion and/or position of a finger, pen, or stylus to a relative position on an IHS display.

SUMMARY

Embodiments of systems and methods for a dynamically reconfigurable touchpad are described. In an illustrative, non-limiting embodiment, an Information Handling System (IHS) may include processor and a memory coupled to the processor, the memory having program instructions stored thereon that, upon execution by the processor, cause the IHS to: receive a configuration parameter from a user; and modify a touchpad by applying the configuration parameter to the operation of proximity sensors disposed under a non-display surface of the IHS.

The configuration parameter may include at least one of: a size of an active touchpad area or a location of the active touchpad area on the touchpad. Additionally, or alternatively, the configuration parameter may include at least one of: a size of a virtual notepad area or a location of the virtual notepad area on the touchpad. Additionally, or alternatively, the configuration parameter may include at least one of: a size of a virtual button or a location of the virtual button on the touchpad. Additionally, or alternatively, the configuration parameter may include a hovering sensitivity setting.

The program instructions, upon execution, may cause the IHS to detect a hovering keystroke above the virtual button. Moreover, the configuration parameter may include a gesture recognition setting. The program instructions, upon execution, may cause the IHS to detect a hand gesture over the touchpad using the gesture recognition setting, at least in part, by fitting proximity data obtained with the proximity sensors to a geometric model of a hand, where the hand gesture comprises a hand inclination, finger splaying, or item selection gesture.

In some implementations, the non-display surface of the IHS may include at least one of: a bezel or a surface opposite a display surface of the IHS. In another illustrative, non-limiting embodiment, a method may include configuring a touchpad having proximity sensors disposed under a non-display surface of an IHS with at least one of: an active touchpad area, a virtual notepad area, or a virtual button, and modifying at least one of: the active touchpad area, the virtual notepad area, or the virtual button.

Configuring the touchpad further may include configuring at least one of: a size of the active touchpad area or a location of the active touchpad area on the non-display surface. Additionally, or alternatively, configuring the touchpad may include enabling gesture recognition over a non-active touchpad area. Additionally, or alternatively, configuring the touchpad may include configuring at least one of: a size of the virtual notepad area or a location of the virtual notepad area on the non-display surface.

Additionally, or alternatively, configuring the touchpad may include applying a given palm rejection setting to the active touchpad area and a different palm rejection setting to the virtual notepad area. Additionally, or alternatively, configuring the touchpad further may include configuring at least one of: a size of the virtual button or a location of the virtual button on the non-display surface. Additionally, or alternatively, configuring the touchpad may include applying a given hovering setting to the active touchpad area and a different hovering setting to the virtual button.

In yet another illustrative, non-limiting embodiment, a hardware memory device may have program instructions stored thereon that, upon execution by a processor of an IHS, cause the IHS to: configure a touchpad having proximity sensors disposed under a non-display surface of the IHS with an active touchpad area, a virtual notepad area, and a virtual button; and modify at least one of: the active touchpad area, the virtual notepad area, or the virtual button.

To modify the active touchpad area, the virtual notepad area, or the virtual button, the program instructions, upon execution, may cause the IHS to receive a selected position of the active touchpad area, the virtual notepad area, or the virtual button via the proximity sensors, and to change a current position of the active touchpad area, the virtual notepad area, or the virtual button to match the selected position.

Additionally, or alternatively, to modify the active touchpad area, the virtual notepad area, or the virtual button, the program instructions, upon execution, may cause the IHS to receive a selected size of the active touchpad area, the virtual notepad area, or the virtual button via the proximity sensors, and to change a current size of the active touchpad area, the virtual notepad area, or the virtual button to match the selected size.

In various implementations, the IHS may modify at least one of: the active touchpad area, the virtual notepad area, or the virtual button by retrieving one or more stored configuration parameters associated with an identified user.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
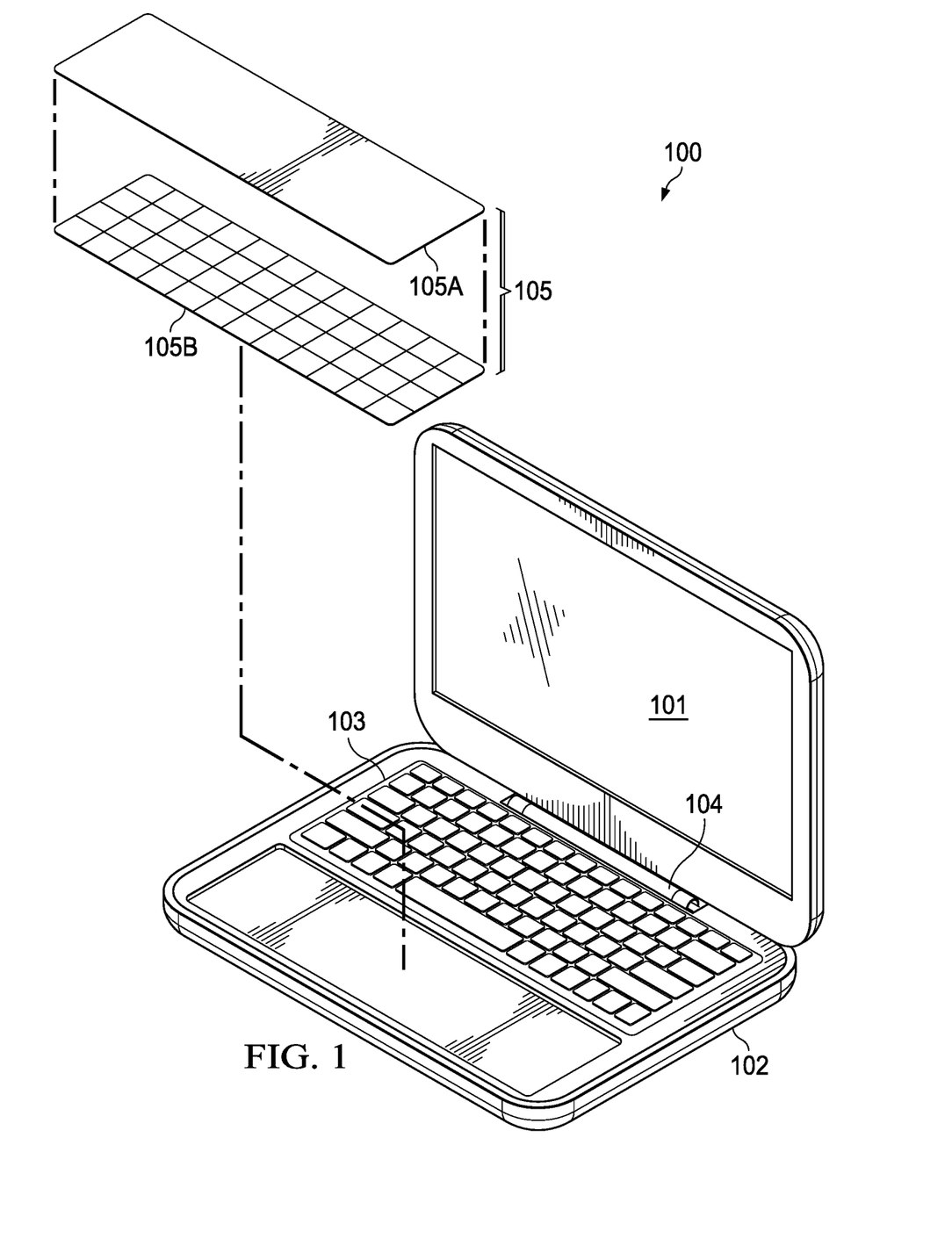
FIG. 1 is a perspective view of an Information Handling System (IHS) with a reconfigurable touchpad, according to some embodiments.

Conventional touchpads are of a fixed size. Although users may have different preferences regarding the size of their touchpads, a conventional touchpad cannot be customized for different users in the same IHS. To address these problems, in various systems and methods described herein, one or more touchpad area sizes can be changed dynamically on a touchpad by: redrawing boundaries as new size, based on user login as predefined in previous setups, or based on an application or game. These systems and methods may provide dynamic configurability of touchpad size, customize the touchpad size to a user's preference, and/or enable dynamic selection of preferred touchpad size/gesture features based on user or application. In some cases, an IHS may configure the location of a touchpad area based on the user's left handed vs. right handed preferences (e.g., more to the left or to the right relative to the center of keyboard 103).

Moreover, systems and methods described herein may support pen/stylus capability for easy note taking or document marking without any wobble or pooling issues. A sensor integrated into the touchpad can be used as pen surface and use as space for notes scribbling or document marking. In some cases, the size of the note taking area may be reconfigured dynamically depending on the current task or application.

In addition, a conventional keyboard may have specific defined functions for its "f-keys" (e.g., F1 to F12), but some or all functionality may be lost when the keyboard layout is reconfigured. Accordingly, techniques described herein also enable reconfigurable virtual buttons on a touchpad for gaming or productivity (e.g., to load ammunition or throw a punch in a game based on the force or pressure of key, or to launch presentation slides or an application by pressing a virtual button or hot spot). In some implementations, these systems and methods may enable gaming keys with pressure, force, direction, and predictability, configured to user preferences dynamically per application or game. In addition, virtual buttons or keys may be mapped to any operation, such as to launch an application or a macro. Feedback to the action can be lighting control or haptics, and it can vary based on the function.

In some cases, these systems and methods may be applied to any non-display surface of the IHS. For example, touchpad features described herein may be added to the bezel of an IHS display, along the perimeter of at least a portion of the display surface. In other cases, touchpad features may be added to the back of display integrated into an IHS (e.g., a laptop), for example, when the IHS is coupled to an external monitor.

FIG. 1 is a perspective view of Information Handling System (IHS) 100 with configurable touchpad 105. In this illustrative, non-limiting embodiment, IHS 100 includes display 101 and base or chassis 102, coupled to each other via hinge 104. Chassis 102 holds keyboard 103.

In this implementation, IHS 100 has a laptop or notebook form factor, such that touchpad 105 is directly integrated thereto. In other implementations, however, IHS 100 may be a desktop computer, video game console, appliance, etc., and touchpad 105 may be a peripheral keyboard separate from IHS 100. In those cases, touchpad 105 may be coupled to IHS 100 via a cable or wire (e.g., over a PS/2 connector, USB bus, etc.) or wirelessly (e.g., Bluetooth). Inputs at touchpad 105 are communicated to touchpad controller 300 (shown in FIG. 3) for use by IHS 100.

Touchpad 105 has at least two layers: surface layer 105A and sensing layer 105B. Surface layer 105A may be made of plastic, metal, or the same material as the remainder of chassis 102, and it some cases it may be the chassis itself. The underlying sensing layer 105B has a series of conductors arranged in an array of parallel lines in two sub-layers, separated by an insulator and crossing each other at right angles to form an M×N matrix or grid. A high frequency signal is applied sequentially between wire pairs in this two-dimensional matrix. The current that passes between nodes is proportional to the capacitance.

When a virtual ground, such as a finger, is placed over one of the intersections between the conductive layer, some of the electrical field is shunted to this ground point, resulting in a change in the apparent capacitance at that point of touchpad 105. The amount of change in the capacitance and/or the location of the touch is then transmitted from a touchpad controller 300 to IHS 100, such that the Operating System (OS) of IHS 100 can process the touch input according to the manner in which touchpad 105 has been configured.

In some cases, sensing layer 105B may be configured to detect hovering touch, such that in some cases, a finger's proximity to surface layer 105A, without actually touching it, can also be detected as a touch input. In some implementations, the detection of hovering touch inputs via sensing layer 105B may take place in addition, or as an alternative to, the concurrent detection of physical touch by sensing layer 105B in the same (or in a different) location of touchpad 105.

Figures 2, 3:
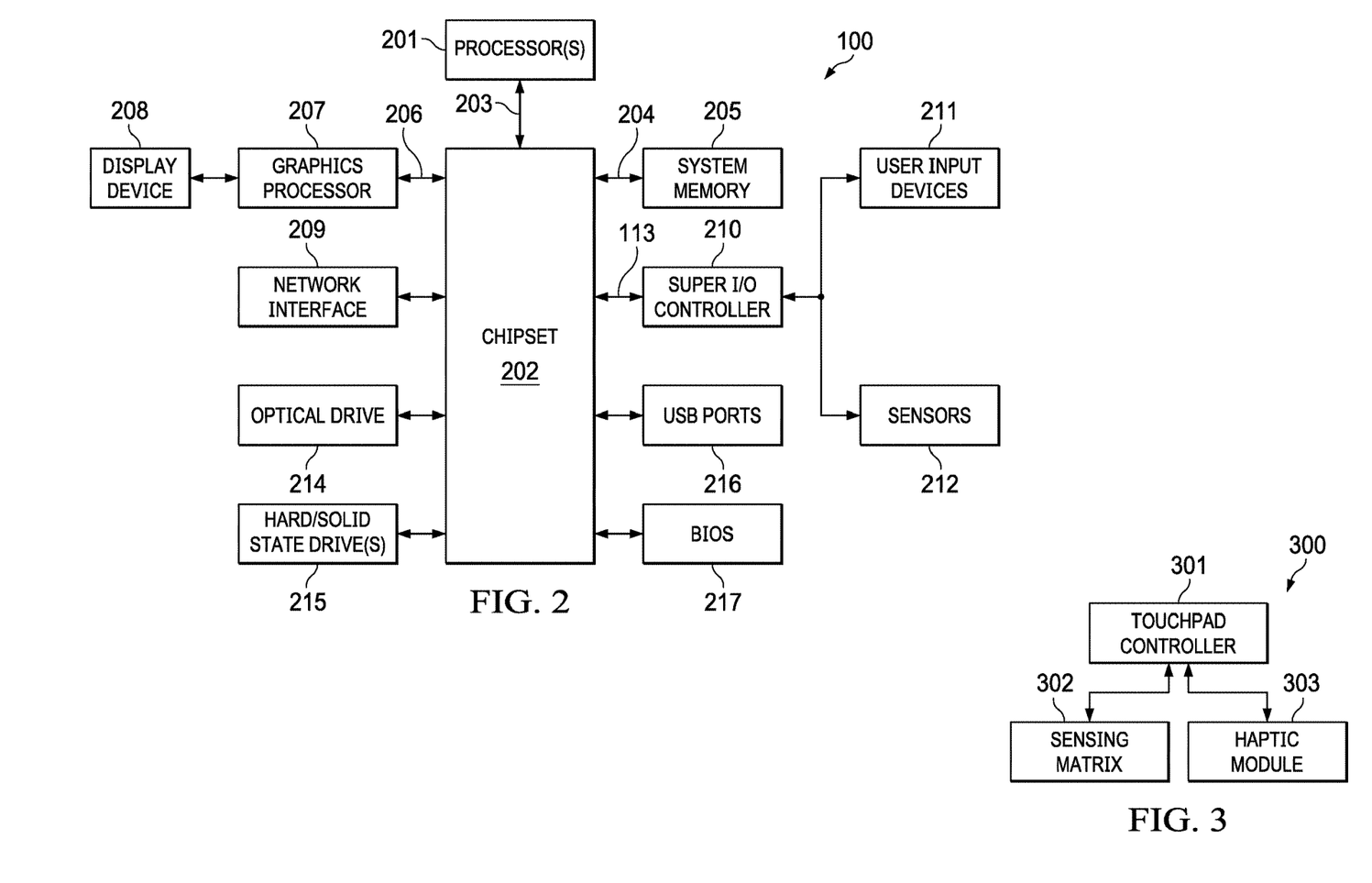
FIG. 2 is a block diagram of electronic components of an IHS, according to some embodiments.
FIG. 3 is a block diagram of electronic components of a reconfigurable touchpad, according to some embodiments.

FIG. 2 is a block diagram of components of IHS 100. Particularly, IHS 100 may include one or more processors 201. In various embodiments, IHS 100 may be a single-processor system including one processor 201, or a multi-processor system including two or more processors 201. Processor(s) 201 may include any processor capable of executing program instructions, such as an INTEL PENTIUM series processor or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 100 includes chipset 202 that may have one or more integrated circuits coupled to processor(s) 201. In certain embodiments, the chipset 202 may utilize a DMI (Direct Media Interface) or QPI (QuickPath Interconnect) bus 203 for communicating with processor(s) 201.

Chipset 202 provides processor(s) 201 with access to a variety of resources. For instance, chipset 202 provides access to system memory 205 over memory bus 204. System memory 205 may be configured to store program instructions and/or data accessible by processors(s) 201. In various embodiments, system memory 205 may be implemented using any suitable memory technology, such as static RAM (SRAM), synchronous dynamic RAM (SDRAM), nonvolatile/Flash-type memory, or any other type of memory.

Chipset 202 may also provide access to graphics processor 207. In certain embodiments, graphics processor 207 may be part of one or more video or graphics cards that have been installed as components of IHS 100. Graphics processor 207 may be coupled to chipset 202 via graphics bus 206 such as provided by an Accelerated Graphics Port (AGP) bus, or a Peripheral Component Interconnect Express (PCIe) bus. In certain embodiments, graphics processor 207 generates display signals and provides them to display device 208. In certain embodiments, display device 208 may be a touch-sensitive display.

In some implementations, chipset 202 may also provide access to one or more user input devices 211. For instance, chipset 202 may be coupled to super I/O controller (SIO) 210 or an embedded controller (EC) via eSPI (Enhanced Serial Peripheral Interface) or Low-Pin Count (LPC) bus 213, and SIO 210 may provide interfaces for a variety of user input devices 211 (e.g., lower bandwidth and low data rate devices). Particularly, SIO 210 may provide access to keyboard 103 and a mouse, or other peripheral input devices such as keypads, biometric scanning devices, and voice or optical recognition devices.

SIO 210 may also provide an interface for communications with one or more sensor devices 212, which may include environment sensors, such as a temperature sensor or other cooling system sensors. These I/O devices, such as user input devices 211 and sensor devices 212, may interface with SIO 210 through wired or wireless connections.

Other resources may also be coupled to processor(s) 201 of IHS 100 through chipset 202. For example, chipset 202 may be coupled to network interface 209, such as a Network Interface Controller (NIC). In certain embodiments, network interface 209 may be coupled to chipset 202 via a PCIe bus. Network interface 209 may support communication via various wired and/or wireless networks.

Chipset 202 may also provide access to one or more hard disk and/or solid state drives 215. In certain embodiments, chipset 202 may also provide access to one or more optical drives 214 or other removable-media drives. Any or all of drive devices 214 and 215 may be integral to IHS 100, or they may be located remotely. Chipset 202 may also provide access to one or more Universal Serial Bus (USB) ports 216.

In certain implementations, chipset IHS 202 may support an I²C (Inter-Integrated Circuit) bus that may be used to communicate with various types of microcontrollers, microprocessor and integrated circuits that are typically integrated components of the motherboard of the IHS 100 and perform specialized operations. For example, such an I²C bus may be utilized to transmit and receive keystroke and hovering keystroke information from an attached keyboard device, and to provide that information to an operating system (OS) executed by IHS 100.

Another resource that may be accessed by processor(s) 201 via chipset 202 is Basic Input/Output System (BIOS) 217. Upon booting of IHS 100, processor(s) 201 may utilize BIOS 217 instructions to initialize and test hardware components coupled to IHS 100 and to load an OS for use by IHS 100. BIOS 217 provides an abstraction layer that allows the OS to interface with certain hardware components that are utilized by IHS 100. The Unified Extensible Firmware Interface (UEFI) was designed as a successor to BIOS; many modern IHSs utilize UEFI in addition to or instead of a BIOS. As used herein, BIOS is also intended to encompass UEFI.

Chipset 202 may also provide an interface for communications with one or more sensors 212. Sensors 212 may be disposed within display 101, chassis 102, keyboard 103, hinge 104, and/or trackpad 105, and may include, but are not limited to: electric, magnetic, radio, optical, infrared, thermal, force, pressure, acoustic, ultrasonic, proximity, position, deformation, bending, direction, movement, velocity, gyroscope, rotation, and/or acceleration sensor(s).

In various embodiments, keyboard controller 300 (shown in FIG. 3) may utilize different interfaces for communicating with the OS of IHS 100. For instance, keyboard controller 300 may interface with the chipset 202 via super I/O controller 210.

FIG. 3 is a block diagram of electronic components 300 of reconfigurable touchpad 105. As depicted, components 300 include touchpad controller or processor 301 coupled to sensing matrix 302 and haptic module 303. Each of components 300 may include electronic circuits, integrated circuits, and/or program instructions. In some implementations, an additional wireless communication module (not shown) may be coupled to touchpad controller 301 to enable communications with IHS 100 using a suitable wireless protocol.

Touchpad controller 301 may be configured to detect and identify individual physical touch inputs or hovering touch inputs made over surface layer 105A. For example, touchpad controller 301 may be configured to control the operation of sensing layer 105B to increase or reduce voltages, currents, etc. to thereby set operating capacitance, sensitivity, hovering travel distance, and palm rejection parameters for physical touch input detection and/or hovering touch input detection. In some cases, controller 301 may apply different parameters to selected portions of an N×M matrix dynamically and independently.

In addition, touchpad controller 301 may be configured to control haptics module 302 to create a sense of touch by applying forces, vibrations, or motions to surface layer 105A. For example, haptics module 302 may include a set of electromagnets and springs disposed under surface layer 105A (e.g., around the perimeter of sensing layer 105B).

In various embodiments, IHS 100 and/or reconfigurable touchpad 105 may not include all of components shown in FIGS. 2 and 3, respectively. Additionally, or alternatively, IHS 100 and/or touchpad 105 may include components in addition to those shown in FIGS. 2 and 3, respectively. Additionally, or alternatively, components represented as discrete in FIGS. 2 and 3 may instead be integrated with other components. For example, all or a portion of the functionality provided by these various components may be provided as a System-On-Chip (SOC), or the like.

Figure 4:
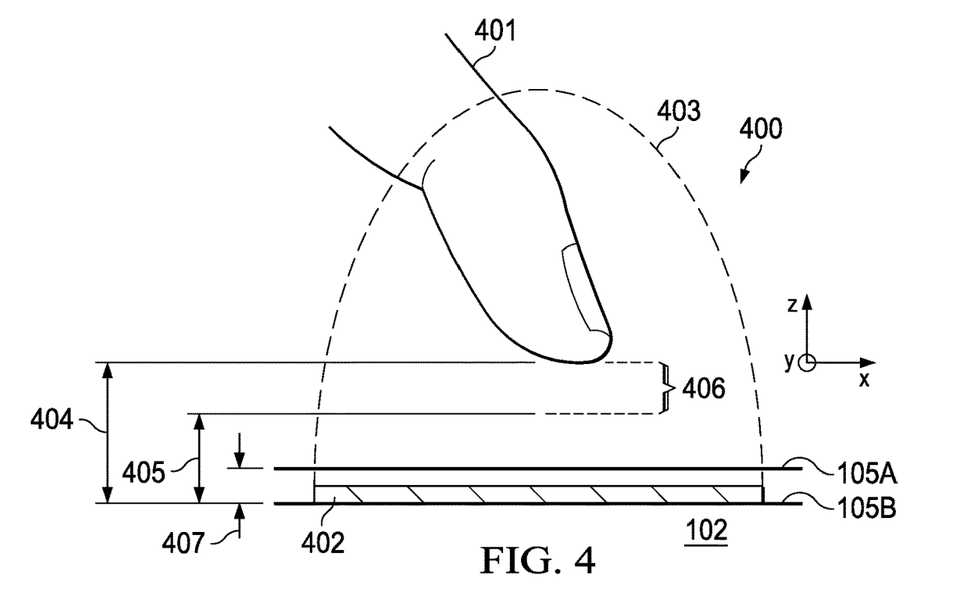
FIG. 4 is sectional view of a reconfigurable touchpad in operation, according to some embodiments.

FIG. 4 is a sectional view of reconfigurable touchpad 105 in operation, according to some embodiments. As depicted, touchpad 105 includes surface layer 105A (e.g., a non-display surface of chassis 102 below keyboard 103) and sensing layer 105B. Sensing layer 105B includes a plurality of capacitive or proximity sensing elements disposed in a matrix, a given sensor shown as 402. Examples of suitable sensors include GESTIC sensors from Microchip Technology Inc.

In operation, sensing element 402 is configured to create sense field 403. A user's finger or fingertip 401 is resting at position 404 relative to sensing layer 105B (or, in some cases, relative to 105A). When finger 401 travels by a selected or configurable distance 406 (in the vertical axis "z") to position 405, the disturbance caused by the user's finger 401 upon sense field 403 triggers detection of a hovering touch input—without finger 401 having to make physical contact with surface layer 105A.

As such, a hovering touch input can be detected when finger 401 travels by a configurable distance 406 (e.g., 1 mm or 2 mm) from its initial position—a shorter travel distance (and less force) than a physical touch input would require. In some cases, height 404 may be configured to become aligned with the height of surface layer 105A, shown here as height 407.

In some implementations, a flickering or snapping action of a fingertip by travel distance 406 may be interpreted as a hovering keystroke or touch input at the matrix location where the detection takes place. An initial value (e.g., 2 mm) for travel distance 406 may be set during a calibration or training process.

Figure 5:
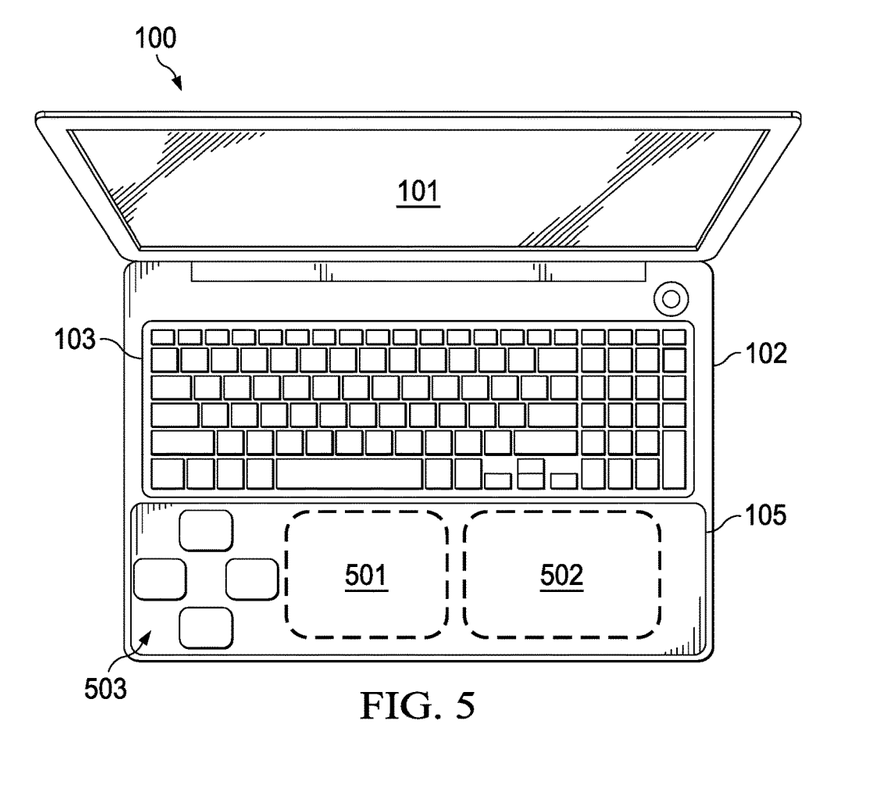
FIG. 5 is an example of touchpad, notepad, and button areas of a reconfigurable touchpad, according to some embodiments.

FIG. 5 is an example of touchpad area(s) 501, notepad area(s) 502, and button area(s) 503 configured on touchpad 105 of IHS 100. In this example, touchpad areas 501-503 are deemed active; that is, configured to detect and/or process hovering keystrokes, touch input events, and/or hand gestures. Meanwhile, areas of touchpad 105 outside of areas 501-503 are deemed inactive, that is, not configured to detect and/or process inputs. In other cases, however, inactive or unconfigured areas of touchpad 105 may continue to be used to detect and/or process hand gestures to the exclusion of hovering or physical touch inputs.

In some embodiments, a user may manually configure any number of touchpad areas 501-503 on any selected location of touchpad 105 as a touchpad, notepad, or virtual button. For example, the user may interact with a touchpad configuration engine executed by processor(s) 201 that provides a Graphical User Interface (GUI) via display 101 through which the user can select touchpad coordinates or "draw" one or more touchpad areas 501, notepad areas 502, and/or button areas 501-503, for example, with a pointing device (e.g., a mouse). These various configuration parameters are then applied to touchpad 105 via touchpad controller 301. Alternatively, the user may provide boundaries or coordinates for any of areas 501-503 using touchpad 105 itself, with finger 401 "drawing" around areas of touchpad 105 with instructions provided via the GUI.

In other embodiments, a software service may detect posture changes, movement, configuration changes, active application/context, etc., and it may automatically configure any number of touchpad areas 503 in response to the detection, for instance, based upon user preferences stored in a look-up table (LUT) or database. As used herein, the term "look-up table" or "LUT" refers to an array or matrix of data that contains items that are searched. In many cases, an LUT may be arranged as key-value pairs, where the keys are the data items being searched (looked up) and the values are either the actual data or pointers to where the data are located.

Each of areas 501-502 may have a number of touchpad configuration parameters associated therewith such as, for example, the area's coordinates and/or boundaries, palm rejection settings, touch input settings, hovering enabled or disabled, hovering travel distance, gesture enabled or disabled, and haptic feedback enabled or disabled.

In the example of FIG. 5, touchpad area 501 includes a first rectangular region below the spacebar of keyboard 103 with palm rejection parameters or settings selected or optimized for finger touch. Conversely, notepad area 502 may be set next to touchpad area 501 and it may have palm rejection parameters or settings selected or optimized for stylus input (e.g., sketching, handwriting, etc.).

With respect to palm rejection settings or parameters, a detection algorithm may be designed to reject touch events that encompass an area of greater than a selected size, such as 25 mm. As such, the threshold size of the rejection area may be used as a palm rejection configuration parameter. For example, the threshold size may be reduced to increase the aggressiveness of the palm rejection, or the threshold size may be increased to reduce the aggressiveness. An enhanced palm rejection may be more aggressive than a standard, normal, or default palm rejection, for example, by applying a smaller threshold size value.

As to touch input settings or parameters, object detection algorithms tend to have low-latency requirements so that users do not experience excessive delays between the timing of an input and the presentation of that input at display 101 (e.g., a cursor). Low latency means that initial small areas of touch that precede a larger touch area may be detected as an intended touch and presented as such to the user. For example, the user may inadvertently rest his palm or arm on active areas of touchpad 105, which may be written before the palm rejection algorithm engages to reject touch input events. In some cases, the latency requirement may be used as a touch input configuration parameter. In operation, the latency requirement may be increased (a smaller time value), for instance, to increase the aggressiveness of the touch input algorithm, and reduced to decrease such aggressiveness.

Characteristics of touchpad areas 501 and 502 include the accuracy of palm rejection and elimination of accidental touch inputs, which often requires different configurations. Accordingly, various embodiments described herein provide different configurations settings to reach a suitable a trade-off between the effectiveness of palm rejection and responsiveness (or accuracy) of touch or gesture recognition across postures.

In some cases, different ones of areas 501-503 of touchpad 105 may be configured to detect the user's hand(s) while the user performs single-handed or two-handed gestures, physical keystrokes, or hovering keystrokes.

Detection at block starts when sensing layer data is received at IHS 100. In some implementations, sensing layer data may be processed, to some degree, by keyboard controller 300. Then, sensing layer data may be further processed by processor(s) 201.

For example, signals that exhibit above-threshold distances and/or motion over a suitable time interval are collected, and then processor(s) 201 attempts to match the captured proximity sensor data to a geometric model of a user's hand. If a suitable match is found, then the hand may be recognized as that of the corresponding user.

In some embodiments, processor(s) 201 be configured to analyze signals from each distinct sensor in order to determine what part of the user's hand each signal represents. A number of different hand-part assignment techniques may be used. For instance, each signal may be assigned a hand-part index. The hand-part index may include a discrete identifier, confidence value, and/or hand-part probability distribution indicating the hand part or parts to which that signal is likely to correspond.

Machine learning may be used to assign each signal a hand-part index and/or hand-part probability distribution. A machine-learning module may analyze a user's hand with reference to information learned from a previously trained collection of known hands and/or hand features.

During a training phase, a variety of hand positions may be observed, and trainers may label various classifiers in the observed data. The observed data and annotations may then be used to generate one or more machine-learned algorithms that map inputs (e.g., observation data from proximity sensors) to desired outputs (e.g., hand-part indices for relevant signals).

Thereafter, a partial virtual skeleton may be fit to at least one hand part identified. In some embodiments, a hand-part designation may be assigned to each skeletal segment and/or each joint. Such virtual skeleton may include any type and number of skeletal segments and joints, including each individual finger.

In some embodiments, each joint may be assigned a number of parameters, such as, for example, Cartesian coordinates specifying its position, angles specifying its rotation, and other parameters (e.g., open hand, closed hand, length, width, joint position, angle of joint rotation, and a description of any finger segment). Then, a virtual skeleton may be fit to each of a sequence of hand parts identified from the sensor data.

In some implementations, a hand gesture may have a Start phase (S) with a standalone gesture, a motion phase (M) with a sequence of gestures following each other, and an end phase (E) with another standalone gesture. In some embodiments, a look-up table may be used to store key attributes and/or reference images of start, motion, and end phases for each gesture sequence to be recognized, for two-handed and one-handed cases.

The training phase may store user-specific finger/hand attributes (e.g., asking user 101 to splay fingers), such as motion velocity or asynchrony. For example, a start or end phase LUT may be created to include reference images or attributes, whereas a motion phase LUT may be created to include relative 6-axes data. The amount of time a user has to hold their hands and/or fingers in position for each phase of gesture sequence (S, M, and E) may be configurable.

To recognize a hand inclination gesture, for example, touchpad controller 301 or processor(s) 201 may detect a flat hand hovering over touchpad 105 with palm down and fingers stretched out and held together, with the fingertips positioned higher (or lower) than the wrist with respect to chassis 102. As part of the gesture recognition process, touchpad controller 301 or processor(s) 201 may calculate an angle of inclination of the user's hand. Then, to recognize a finger splaying gesture following the hand inclination gesture, touchpad controller 301 or processor(s) 201 detects the same flat hand hovering over touchpad 105 with palm still down, but now with fingers spread apart. Touchpad controller 301 or processor(s) 201 may also calculate an amount (e.g., average distance between finger tips, knuckles, etc.) of separation between fingers.

An example of a task selection gesture includes a finger pointing gesture, with the middle, ring, and pinky fingers curled onto the palm of the hand, with the exception of index finger, which remain stretched out. In other cases, the task selection process may be a hovering keystroke over a virtual button area 503 of trackpad 105.

In addition to areas 501 and 502, each of button areas 503 may include hovering keypress settings and physical touch settings that enable both uses of those areas. For example, detection of hovering keystroke above area 503 may be recorded as a first type of event, mapped to a first command (e.g., to a first application) and detection of physical keystroke on area 503 may be recorded as a second type of event, mapped to a second command (e.g., to a second application).

In some cases, all of areas 501-503 produce touch input events that are mapped to the same application being executed by the IHS's OS. In other cases, each of areas 501-502 may produce touch input events that are mapped to different applications. In addition, hand gestures over touchpad 105 may be mapped to yet another application.

Figure 6:
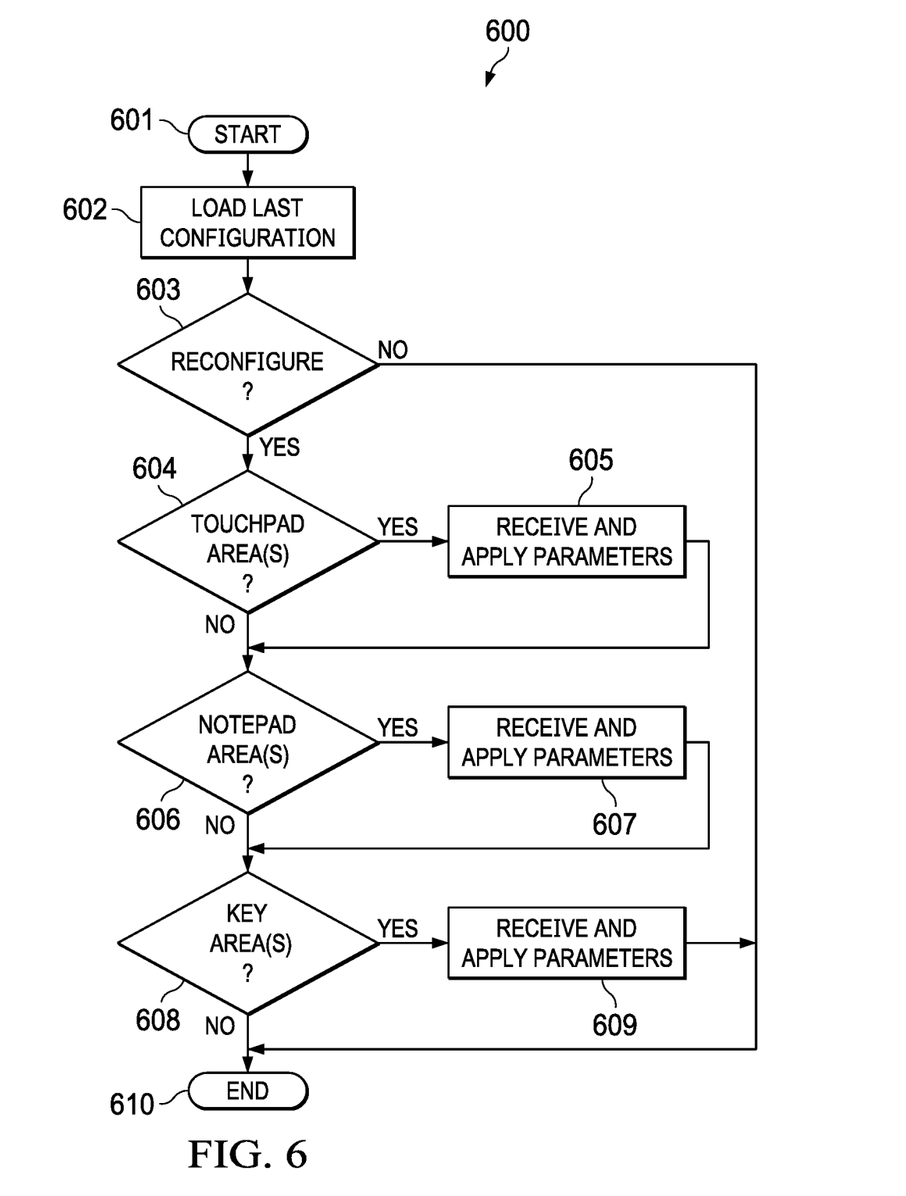
FIG. 6 is a flowchart of an example of a method for dynamically reconfiguring a touchpad, according to some embodiments.

FIG. 6 is a flowchart of an example of method 600 for dynamically reconfiguring a touchpad. In various embodiments, program instructions for implementing method 600 may be stored in memory 205 and are executable by processor(s) 201. In some cases, method 600 may be performed by one or more standalone software applications, drivers, libraries, or toolkits, accessible via an Application Programming Interface (API) or the like. Additionally, or alternatively, method 600 may be performed by the IHS's OS.

Particularly, method 600 begins at block 601. At block 602, method 600 loads a last configuration of touchpad 105. For example, for an identified user of IHS 100, touchpad configuration parameters that determine the number, size, and position of areas 501-503, as well as any touchpad setting specific to those areas, may be stored as preferences and retrieved by method 600 at block 602. If, on the other hand, the current user of IHS 100 is a new or unidentified user, a selected one of a plurality of preset configuration parameters (e.g., default, left handed, right handed, custom, etc.) may be retrieved at block 602.

If IHS 100 does not receive a touchpad reconfiguration command or selection from a user at block 603, method 600 ends at block 610. Otherwise, at block 604, method 600 allows the user to select a touchpad area (e.g., area 501). If the user selects to set up touchpad area(s) 501, block 605 may receive parameters or settings to be applied to touchpad 105, including, but not limited to: a number of touch areas, size(s), coordinates, position(s), touch rejection parameters, touch input parameters, hovering parameters, and/or gesture recognition parameters specific to touchpad area 501.

At block 606, method 600 allows the user to select a notepad area (e.g., area 502) for touchpad 105. If the user selects to set up notepad area(s) 502, block 607 may receive parameters or settings to be applied to touchpad 105, including, but not limited to: a number of notepad areas, size, coordinates, position, touch rejection parameters, touch input parameters, hovering parameters, and/or gesture recognition parameters specific to notepad area 502.

At block 608, method 600 allows the user to select a virtual button or key area (e.g., 503) for touchpad 105. If the user selects to set up button(s) or key(s) 503, block 609 may receive parameters or settings to be applied to button(s) or key(s) 503, including, but not limited to: a number of virtual buttons or key areas, sizes, coordinates, positions, touch rejection parameters, touch input parameters, hovering parameters, and/or gesture recognition parameters specific to virtual button 503.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution by the processor, cause the IHS to:
receive one or more stored configuration parameters for configuring a virtual button on a touchpad;
receive, using the virtual button, training data associated with a first occurrence of a hand gesture from a user, the training data comprising a start phase, a motion phase, and an end phase of the hand gesture;
receive, using the virtual button, a second occurrence of the hand gesture by applying the training data to the operation of proximity sensors disposed under a non-display surface comprising a touchpad of the IHS, the training data applied by comparing the start phase, the motion phase, and the end phase of the training data against the start phase, the motion phase, and the end phase associated with the second occurrence of the hand gesture, the hand gesture being void of any physical contact with the non-display surface;
perform a first application command in response to the second occurrence of the hand gesture over the virtual button;
receive information associated with a keypress event comprising physical contact of the hand of the user on the virtual button; and
perform a second application command in response to the keypress event, the second application command being different than the first application command.

2. The IHS of claim 1, wherein the program instructions, upon execution, further cause the IHS to receive a size configuration parameter comprising a size of an active touchpad area on the touchpad.

3. The IHS of claim 1, wherein the program instructions, upon execution, further cause the IHS to receive a size configuration parameter comprising a size of a virtual notepad area on the touchpad.

4. The IHS of claim 1, wherein the program instructions, upon execution, further cause the IHS to receive a size configuration parameter comprising a size of the virtual button on the touchpad.

5. The IHS of claim 4, wherein the program instructions, upon execution, further cause the IHS to receive a hovering configuration parameter comprising a hovering sensitivity setting.

6. The IHS of claim 5, wherein the program instructions, upon execution, further cause the IHS to detect a hovering keystroke above the virtual button.

7. The IHS of claim 1, wherein the program instructions, upon execution, further cause the IHS to detect the hand gesture over the touchpad, at least in part, by fitting proximity data obtained with the proximity sensors to a geometric model of a hand, wherein the hand gesture comprises a hand inclination, finger splaying, or item selection gesture.

8. The IHS of claim 1, wherein the non-display surface of the IHS comprises at least one of: a bezel or a surface opposite a display surface of the IHS.

9. A method, comprising:
configuring a touchpad having proximity sensors disposed under a non-display surface of an Information Handling System (IHS) with a virtual button;
receiving, using the virtual button, training data associated with a first occurrence of a hand gesture from a user, the training data comprising a start phase, a motion phase, and an end phase of the hand gesture;
receiving, using the virtual button, a second occurrence of the hand gesture by applying the training data to the operation of proximity sensors disposed under the non-display surface of the IHS, the training data applied by comparing the start phase, the motion phase, and the end phase of the training data against the start phase, the motion phase, and the end phase associated with the second occurrence of the hand gesture, the hand gesture being void of any physical contact with the non-display surface;
performing a first application command in response to the second occurrence of the hand gesture over the virtual button;
receiving information associated with a keypress event comprising physical contact of the hand of the user on the virtual button; and performing a second application command in response to the keypress event, the second application command being different than the first application command.

10. The method of claim 9, wherein configuring the touchpad further comprises configuring a size of an active touchpad area on the non-display surface.

11. The method of claim 10, wherein configuring the touchpad further comprises configuring a size of a virtual notepad area on the non-display surface.

12. The method of claim 11, wherein configuring the touchpad further comprises applying a given palm rejection setting to an active touchpad area and a different palm rejection setting to a virtual notepad area.

13. The method of claim 9, wherein configuring the touchpad further comprises enabling gesture recognition over a non-active touchpad area.

14. The method of claim 9, wherein configuring the touchpad further comprises configuring a size of the virtual button on the non-display surface.

15. The method of claim 14, wherein configuring the touchpad further comprises applying a given hovering setting to an active touchpad area and a different hovering setting to the virtual button.

16. A hardware memory device having program instructions stored thereon that, upon execution by a processor of an Information Handling System (IHS), cause the IHS to:
configure a touchpad having proximity sensors disposed under a non-display surface of an Information Handling System (IHS) with a virtual button;
receive, using the virtual button, training data associated with a first occurrence of a hand gesture from a user, the training data comprising a start phase, a motion phase, and an end phase of the hand gesture;
receive, using the virtual button, a second occurrence of the hand gesture by applying the training data to the operation of proximity sensors disposed under the non-display surface of the IHS, the training data applied by comparing the start phase, the motion phase, and the end phase of the training data against the start phase, the motion phase, and the end phase associated with the second occurrence of the hand gesture, the hand gesture being void of any physical contact with the non-display surface;
perform a first application command in response to the second occurrence of the hand gesture over the virtual button;
receive information associated with a keypress event comprising physical contact of the hand of the user on the virtual button; and
perform a second application command in response to the keypress event, the second application command being different than the first application command.

17. The hardware memory device of claim 16, wherein to modify an active touchpad area, a virtual notepad area, or the virtual button, the program instructions, upon execution, further cause the IHS to receive a selected position of the active touchpad area, the virtual notepad area, or the virtual button via the proximity sensors, and to change a current position of the active touchpad area, the virtual notepad area, or the virtual button to match the selected position.

18. The hardware memory device of claim 16, wherein to modify an active touchpad area, a virtual notepad area, or the virtual button, the program instructions, upon execution, further cause the IHS to receive a selected size of the active touchpad area, the virtual notepad area, or the virtual button via the proximity sensors, and to change a current size of the active touchpad area, the virtual notepad area, or the virtual button to match the selected size.

19. The hardware memory device of claim 16, wherein the program instructions, upon execution, further cause the IHS to modify at least one of: an active touchpad area, the virtual notepad area, or the virtual button by retrieving one or more additional stored configuration parameters associated with an identified user.

* * * * *